(12) United States Patent
Olivares Baena

(10) Patent No.: US 8,152,057 B2
(45) Date of Patent: Apr. 10, 2012

(54) METHOD OF AUTHORISING A TRANSACTION BETWEEN A COMPUTER AND A REMOTE SERVER AND COMMUNICATIONS SYSTEM, WITH IMPROVED SECURITY

(75) Inventor: Bartolome Olivares Baena, Barcelona (ES)

(73) Assignee: Avenida Diagonal 477, S.L., Barcelona (ES)

( * ) Notice: Subject to any disclaimer, the term of this patent is extended or adjusted under 35 U.S.C. 154(b) by 452 days.

(21) Appl. No.: 12/421,487

(22) Filed: Apr. 9, 2009

(65) Prior Publication Data

US 2009/0255987 A1    Oct. 15, 2009

(30) Foreign Application Priority Data

Apr. 14, 2008  (ES) .................................. 200801059

(51) Int. Cl.
 *G06K 5/00*   (2006.01)
(52) U.S. Cl. .......................... 235/380; 235/487; 235/492
(58) Field of Classification Search .................. 235/380, 235/375, 492, 487, 451
See application file for complete search history.

(56) References Cited

U.S. PATENT DOCUMENTS

| 2005/0218214 A1 | 10/2005 | Gravelle et al. |
| 2006/0219776 A1 | 10/2006 | Finn |
| 2010/0039234 A1* | 2/2010 | Soliven et al. ............... 340/10.1 |
| 2011/0035604 A1* | 2/2011 | Habraken ..................... 713/193 |

FOREIGN PATENT DOCUMENTS

| WO | WO 2005/106722 | 11/2005 |
| WO | WO 2006/045151 | 5/2006 |

OTHER PUBLICATIONS

Search Report dated Dec. 22, 2010, issued in the corresponding Spanish Patent Application No. 200801059.

* cited by examiner

Primary Examiner — Edwyn Labaze
(74) Attorney, Agent, or Firm — Buchanan Ingersoll & Rooney PC.

(57) ABSTRACT

A transaction between a computer, a remote server and a communications system can be authorized securely. A portable card reader is connected to a computer. Then, the portable card reader reads card data. The portable card reader reads an identification code from a separate RFID tag. Sensitive card identification data and the identification code is sent to a management server. The sensitive identification data is searched for a unique code set in an electronic memory of a management server. If the search does not produce a positive result, an instruction denying the transaction is generated.

8 Claims, 4 Drawing Sheets

METHOD OF AUTHORISING A TRANSACTION BETWEEN A COMPUTER AND A REMOTE SERVER AND COMMUNICATIONS SYSTEM, WITH IMPROVED SECURITY

FIELD

Embodiments disclosed herein relate to a method for authorizing a transaction between a computer and a remote server, together with a system for sending sensitive information contained in readable cards by the Internet.

BACKGROUND

Typically, sensitive information may refer to personal data, such as, for example, identification data, personal medical data, banking data or any kind of data. The data must be protected from attempts to steal information by different security techniques, such as, data encryption, interactive user and/or hardware validation methods, etc.

However, when the communications network used is an Internet-type network, the techniques and technologies known to date do not satisfactorily resolve the problem of achieving a level of security similar to that in the "real" world. For example, in the real world, credit cards use the following security means: banking data is contained on a readable card, such as a card with a magnetic strip or chip; the user identifies himself as the owner of the card to the owner of the payment terminal; an identification number (PIN) is transmitted to a sensitive data management server to authenticate the owner up to the server, together with the card identification number (PAN). The data is transmitted by a telephone network or other communications network; and the owner signs an authorization of the monetary transaction performed.

However, when the transmission is by the Internet, via web interfaces, it is impossible to achieve this level of security. In fact, in whatever authorization or encryption method used, an individual who obtains the sensitive information in question (for example, the card number (PAN) and, if applicable, the personal identification number (PIN)) may force a transaction against the wishes of the legitimate card user. Obtaining this sensitive information or data is relatively easy, for example, if the card is stolen or lost.

The present specification discloses a method and a communications system for achieving levels of security similar to those present in transactions carried out by communications systems other than the Internet.

More particularly, the patent application comprises a method of authorizing a transaction between a computer and a remote server connected via a remote communications network, comprises the following steps: connecting a portable card reader to a computer by a standard communications port; reading a card data by the portable card reader; sending at least one item of sensitive card identification data to a management server for managing sensitive data contained in readable cards via a communications network connected to the computer; searching the electronic memory of the management server for the sensitive card identification data set sent; and, if the search does not return any positive data, the management server generates an instruction denying the transaction.

The method may be implemented by a system for sending sensitive information contained on a readable card via Internet-type networks, comprising: a computer with a connection to a remote communications network; a remote server connected to the computer via the remote communications network; and a management server for controlling sensitive data contained in readable cards, such that the system requests sensitive information contained on the readable card to authorize a transaction between the computer and the remote server, the authorization being issued by the management server according to an authorization procedure. The system can also comprise: a portable card reader connected to the computer via a standard communications port; in which communications between the different elements of the system are established by reading card data by the card reader; transmitting at least one item of sensitive card identification data, read by the card reader, to the management server via a communications network; and generating by the management server an instruction to deny or authorize the authorization.

The method and system are advantageous because they can achieve an improved level of security, in different ways. In fact, the portable card reader, which can be connected to any computer by a standard communications port, may "replace" the card owner in the proposed communications system. Thus, sensitive data is not input via the computer keyboard (a point through which the secure communications may be compromised) but are read by a card reader which need not be a fixed part of the computer that establishes the connection, improving security. The reader can be carried from one computer to another by the card owner, being portable, since it can be connected by a standard port.

However, any security system can be compromised in one way or another, and it is therefore desirable to increase security. Nevertheless, security systems generally tend to reduce the versatility and convenience of applications.

SUMMARY

The object of one embodiment of the present disclosure is to provide a method and a system, with improved anti-theft security and, at the same time, greater versatility.

More precisely, exemplary embodiments of the present disclosure provide a method in which the following steps are included: reading an RFID identification code from a separate RFID tag by a radio-frequency identification reading unit (RFID) situated in the portable card reader; sending the read identification code to a data management server; searching for a unique code—RFID identification code set, or an item of sensitive data—RFID identification code set; and if the above search does not produce any positive data, generating by the management server an instruction denying said transaction.

In one embodiment, the search is carried out on the item of sensitive data—RFID identification code set, the RFID number and the credit card being connected. Alternatively, to avoid restricting consumption, the RFID number and the card reader number may be connected. In this case, the search may be performed on the RFID identification code—unique code set.

Moreover, another embodiment provides a system comprising: a separate RFID tag; and an RFID reader integrated in a portable card reader, wherein the following communications are established between the different elements of the system: reading of an RFID identification code contained in the RFID tag, and transmitting of the RFID identification code to the management server via the communications network.

According to some embodiments, security is increased by means of the RFID code of the RFID tag. In addition, since it is a separate RFID tag, it has the advantage of accompanying the user and performing its function without needing to be shown in order to make payment owing to the remote reading made possible by the RFID technology.

The RFID tag may be in a form integrated with a system, such as a key, for example, or even more advantageously, it may be integrated in an object of different functionality from the rest of the system components.

To increase security, the reader can have a memory with a unique code associated with the reader and in the transmission phase, the unique code is transmitted together with the item or items of sensitive card data.

The reader can have a memory with a unique code associated with the reader and in the transmission phase, the unique code is transmitted together with the item or items of sensitive card data.

The system can search for the item of sensitive identification data—unique code set in an electronic memory of the management server, the management server generating an instruction denying authorization if the search does not return a positive result.

The reader can have a chip for encrypted communication with the management server.

The accompanying drawings show embodiments by way of an explanatory, but not limiting, example.

DETAILED DESCRIPTION

Figure 1:
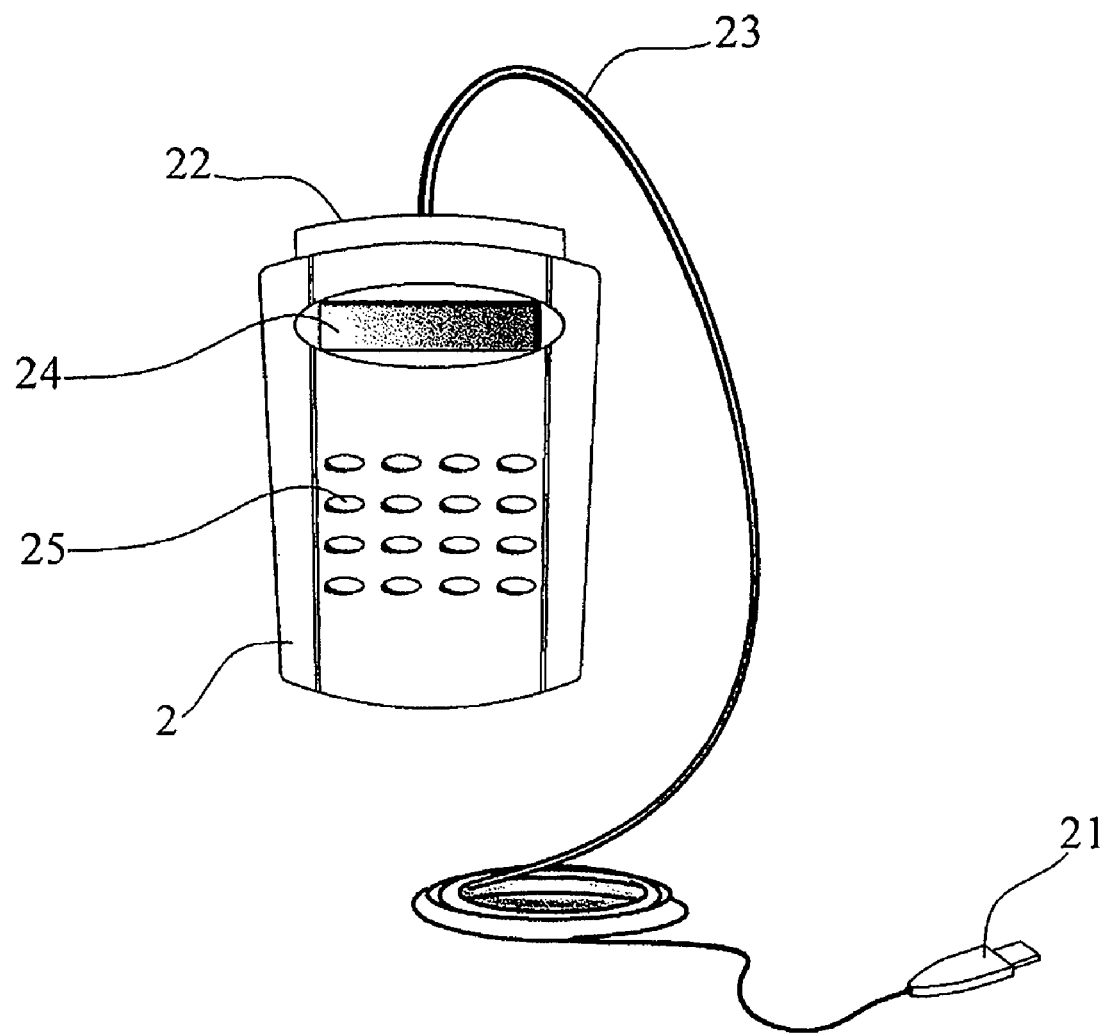
FIG. 1 shows a diagram of a card reader belonging to a system according to an exemplary embodiment.

FIG. 1 illustrates a card reader 2 which forms part of a communications system according to an exemplary embodiment. As shown, card reader 2 is portable and has a screen 24, a numeric keyboard 25 and a card reading slot 22. The reader 2 has a standard port connector 21 (for example, USB) connected to the reader by a communications cable 23 (for example, USB). The connector 21 allows the reader 2 to be connected to any computer, such that card data are not input by keyboard, but read by card reader 2, which provides greater security, as it is possible to check, for example, the connection of the card reader to the computer before issuing, for example, a payment authorization.

Figure 2:
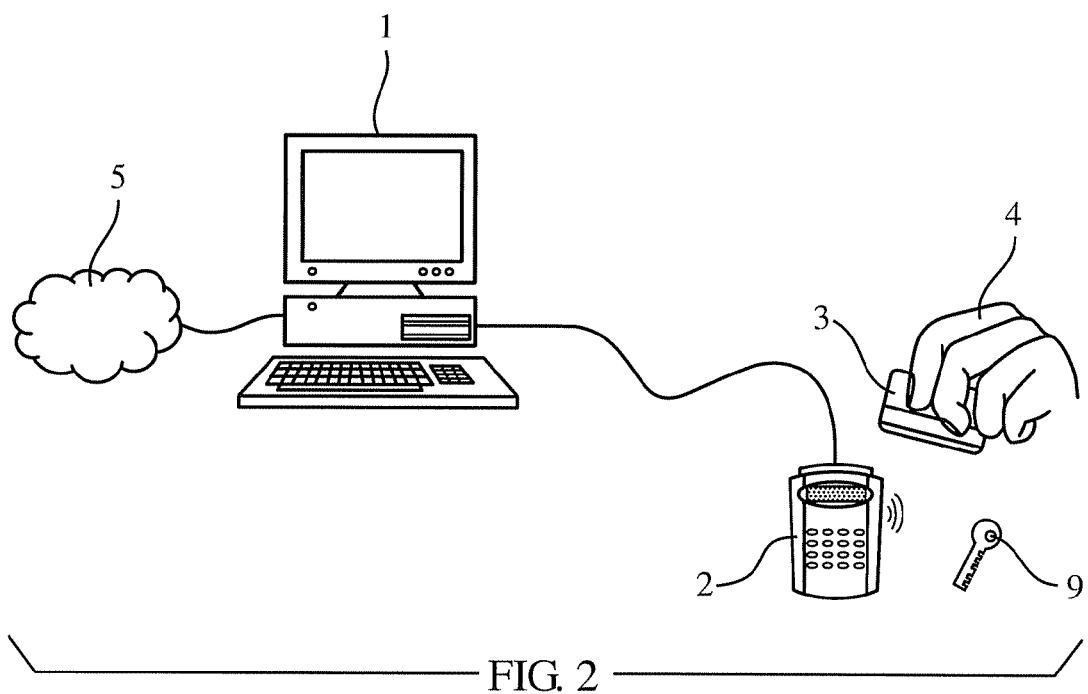
FIG. 2 is a diagram of the elements of a system according to an exemplary embodiment, as seen by the user.
Figure 4:
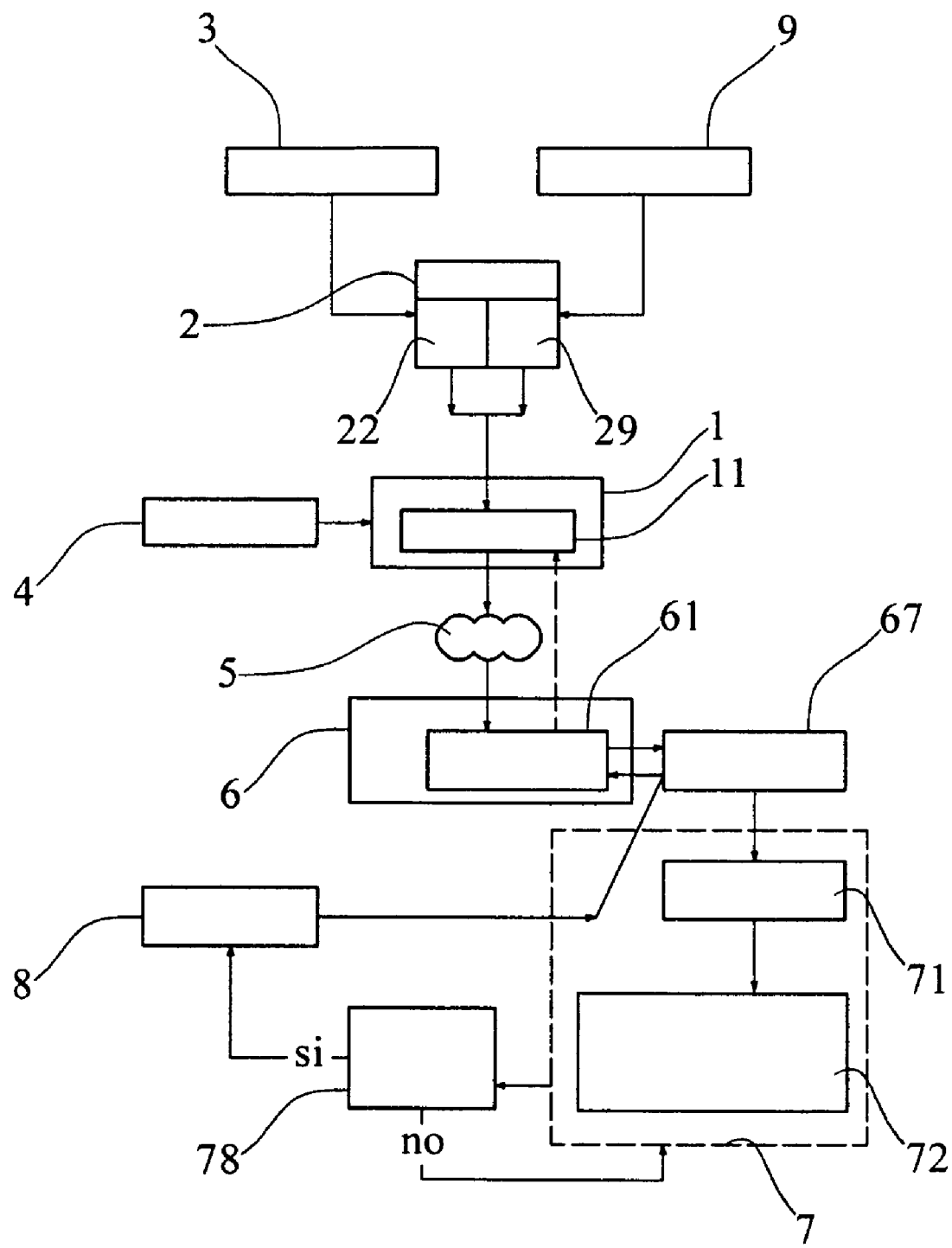
FIG. 4 is a block diagram showing the relationship between different elements of the system of an exemplary embodiment.

Further, card reader 2 has an integrated RFID reader 29 (shown in FIG. 4) capable of remotely reading an identification code contained in an RFID tag 9 (shown in FIGS. 2 and 4). The RFID technology allows tags to be read from tens of meters distance, and it is therefore possible for RFID tag 9 to be integrated in an object that has a different purpose from that of the rest of the system. For example, it may be in the form of a key ring or house key, as shown in FIG. 2. This allows the tag to be unobtrusive, practical, convenient to carry and secure. Alternatively, it is also possible to give it the form of a specific key and place a reception area for said specific key in the reader 2, for example.

Although not shown in the figures, internally, card reader 2 may have a memory containing a unique code associated with the card reader. This also allows the presence of the card owner to be validated at the terminal connected to an Internet network, so that it will not be possible to make fraudulent payments simply by stealing the card.

In FIG. 2, a computer 1 is shown connected to an Internet network 5 which has been connected a card reader 2 through reading slot 22 of which user 4 passes a card 3 having sensitive data (for example, an identification card, a health card or a credit card) thereon. The RFID reader 29 also reads an RFID identification code from the RFID tag 9.

Figure 3:
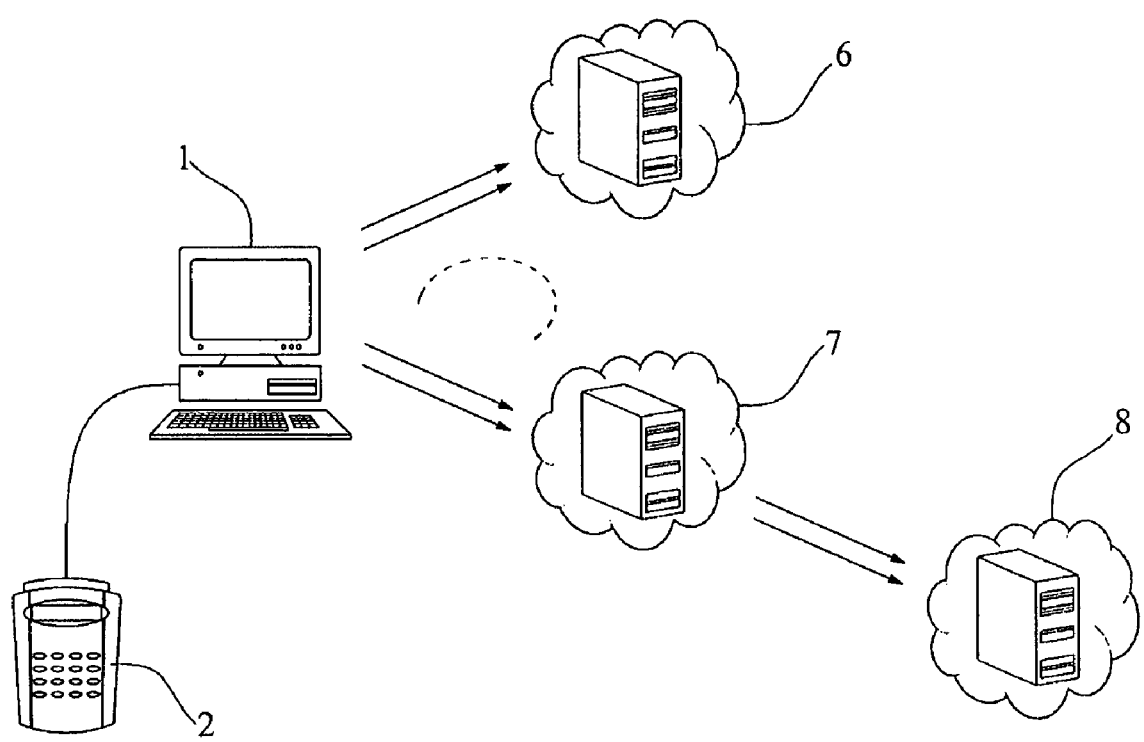
FIG. 3 is a diagram of the different elements of a system according to an exemplary embodiment, which performs a method.

FIG. 3 illustrates elements of a system according to an exemplary embodiment. In the diagram, computer 1, is connected to card reader 2 via a remote communications network (typically the Internet) to a remote server 6. A transaction is set up between the computer 1 which must be authorized. The transaction may be an order, or any kind of information transmission, for example. The validation data are data contained in a readable card, and authorization may be given, typically, by authorization server 8 (for example, in the case of credit cards, a server of a credit entity). According to an exemplary embodiment, there is a server 7 controlling sensitive data contained in readable cards, which provides authorization of the transaction. In the case of credit cards, the management server 7 may be the same as the authorization server 8, or it may be a different one.

FIG. 4 illustrates a block diagram of a method for implementing an exemplary embodiment. In operation, for authorization of the transaction established between computer 1 and remote server 6, the card reader 2 reads an item of sensitive card data by means of reader 22 (for example, a "smart card" reader) and also reads an RFID identification code from the RFID tag or "ekey" by means of the RFID reading device 29. This data is sent via computer 1 and the remote communications network 5 to management server 7, which gives authorization directly, or after consulting the authorization server 8, as applicable. The connection between management server 7 and card reader 2 may occur with or without the intermediary of remote server 6. If the data passes through remote server 6, it is extremely important for security to maintain the confidentiality of this data. Accordingly, it is preferable for the reader to have a chip for encrypted communication with the server. Additionally or alternatively, computer 1 has a data management application for reader 11 ("stand alone") which is related to another application 61 of server 6, which is responsible for carrying out a secure communications method between computer 1, the server 6 and the management server 7 ("application server"). Preferably, therefore, applications 61 and 11 should be controlled by and/or related to management server 7.

As illustrated in FIG. 4, data read by card reader 2 are processed by "stand alone" application 11 which configures computer 1, and the data is sent via Internet network 5 to server 6. The transmission used should be a secure communications procedure, for example, based on an SSL protocol. The server application 61 is put in contact via a proxy server 67 with the management server 7 sending it the agreed data for authorization.

In addition to the data from card 2 and from tag 9, a unique code which identifies card reader 2 may also be sent to management server 7. Management server 7 can take the data, for example via an application server 71, and searches in a special electronic memory 72, for example via a search engine 78 of application server 71, for the RFID identification data pair and the unique code of the reader, discharging the transaction only if the search returns a positive result. Discharge may be carried out directly, or via authorization server 8, to which at least the information from the card 3 is sent. The authorization server 8 accepts or denies the transaction, for example, by sending an authorization notice to proxy server 67 of the server 6.

Memory 72 of management server 7, for example, contains all of the serial numbers of all available readers with the associated RFID numbers, preferably, the same unique reader RFID. Thus, each reader and RFID tag thereof are related in a database contained in memory 72.

In addition, to authorize the transaction, a search may be made for the data set unique code—item of sensitive data, similar to the one described above for the unique code—RFID identification code set. The search may be performed by authorization server 8, and authorization will depend on a positive result from one or, more preferably, both searches.

In this way, card reader 2 is related to RFID tag 9, and, alternatively, to card 3, so that to illegally substitute a user 4, it is necessary to steal or forge the card 3 (and not just the PAN thereof) of reader 2, and also as many security numbers (for example PIN, VAN) as may be wished to establish. The RFID must also be replaced, but this cannot pass unnoticed by the person defrauded since the RFID is read remotely without the user needing to take out and show the RFID tag.

In some embodiments, the reader has a chip for exchanging data between the reader and the management server 7. The communication may be encrypted, in other words, management server 7 is the only one authorized to access particular data from the reader.

An embodiment of the present disclosure provides novel technical means which provide a level of security for cards in Internet networks similar to that used outside the field, with the expectation of providing improved results when making sales via the medium.

Although embodiments of the invention have been described with regard to exemplary embodiments, these should not be considered as limiting the invention, which should be defined by the broadest, reasonable interpretation of the following claims.

What is claimed is:

1. A method of authorizing a transaction between a computer and a remote server connected via a remote communications network, said method comprising the following steps:
   connecting a portable card reader to the computer by means of a standard communications port;
   reading of the card data by the portable card reader;
   sending of at least one item of sensitive card identification data to a server for managing sensitive data contained in readable cards via a communications network to which the computer is connected;
   searching for the unique set of sent data in an electronic memory of the management server; and
   if the above search does not produce any positive data, generating by the management server of an instruction denying said transaction;
   wherein the method also includes the following steps:
     reading by a radiofrequency identification reading unit (RFID) situated in the portable card reader, of an RFID identification code from a separate RFID tag;
     sending the read identification code to said data management server;
     searching for the item of sensitive data—RFID identification code set;
     reading a unique code placed in a memory of said reader and in that in said transmission phase the item or items of sensitive card data are transmitted together with the unique code and the RFID identification code;
   and
   if the above search does not produce any positive data, generating by the management server of an instruction denying said transaction.

2. The method according to claim 1, characterized in that the management server generates an instruction denying authorization if any of the searches does not return a positive result.

3. The method according to claim 1, characterized in that the communication between the reader and the management server is established without the intermediary of the remote server.

4. The method according to claim 3, characterized in that said communication is encrypted.

5. A system for sending sensitive information contained in a readable card by Internet-type networks, said system comprising:
   a computer connected to a remote communications network;
   a remote server connected to said computer via the remote communications network;
   a management server for managing sensitive data contained in readable cards;
   a portable card reader connected to the computer by a standard communications port;
   a separate RFID tag; and
   an RFID reader integrated in the portable card reader,
   wherein the system is configured to request sensitive information contained in the readable card for authorization of a transaction between the computer and the remote server, said authorization being issued by the management server according to an authorization procedure, and
   wherein the following communications are established between the different elements of the system:
     reading of the card data by the portable card reader;
     transmitting at least one item of sensitive card identification data, read by the portable card reader, to the management server via a communications network;
     generating an instruction, by the management server, denying or authorizing the authorization; characterized in that the system also comprises:
     reading of an RFID identification code, contained in the RFID tag, and
     transmitting said RFID identification code to the management server via the communications network,
   wherein said portable card reader has a memory with a unique code associated with the portable card reader and in that in said transmission phase, the unique code is transmitted together with the item or items of sensitive card data and with the RFID identification code.

6. The system according to claim 5, characterized in that the system searches for the RFID identification code—unique code set, or for the RFID identification code—unique code set in an electronic memory of the management server, said management server generating an instruction denying authorization if the search does not return a positive result.

7. The system according to claim 5, characterized in that the reader has a chip for encrypted communication with the management server.

8. The system according to claim 5, characterized in that the separate RFID tag is integrated in an object of different functionality from that of the rest of the system components.

* * * * *